US 11,503,912 B2

(12) United States Patent
Mulligan et al.

(10) Patent No.: US 11,503,912 B2
(45) Date of Patent: Nov. 22, 2022

(54) CABINET LEG AND ADJUSTMENT TOOL

(71) Applicants: Justin Bernard Mulligan, Osborne Park (AU); Paul Simon Lings, Osborne Park (AU)

(72) Inventors: Justin Bernard Mulligan, Osborne Park (AU); Paul Simon Lings, Osborne Park (AU); Edward Joseph Khoury, Bateman (AU)

(*) Notice: Subject to any disclaimer, the term of this patent is extended or adjusted under 35 U.S.C. 154(b) by 42 days.

(21) Appl. No.: 16/955,645

(22) PCT Filed: Dec. 11, 2018

(86) PCT No.: PCT/AU2018/051323
§ 371 (c)(1),
(2) Date: Jun. 18, 2020

(87) PCT Pub. No.: WO2019/119027
PCT Pub. Date: Jun. 27, 2019

(65) Prior Publication Data
US 2020/0383475 A1    Dec. 10, 2020

(30) Foreign Application Priority Data
Dec. 19, 2017    (AU) .............................. 2017905072

(51) Int. Cl.
*A47B 91/00*    (2006.01)
*A47B 91/02*    (2006.01)
(Continued)

(52) U.S. Cl.
CPC ............ *A47B 91/024* (2013.01); *A47B 91/16* (2013.01); *B25B 23/0021* (2013.01); *F16M 7/00* (2013.01);
(Continued)

(58) Field of Classification Search
CPC ........ A47B 91/024; A47B 91/16; A47B 91/02; A47B 91/022; B25B 23/0021;
(Continued)

(56) References Cited

U.S. PATENT DOCUMENTS 33,297 A * 12/1885 Hall
1,417,639 A *  5/1922 Sterner ................ A47B 91/028
248/188.4
(Continued)

FOREIGN PATENT DOCUMENTS

CN    203023749 U    6/2013
CN    109803559    *    5/2019
(Continued)

OTHER PUBLICATIONS

Australian Search Report and Written Opinion from corresponding AU Application No. 2017905072, dated Nov. 27, 2018.
(Continued)

*Primary Examiner* — Janet M Wilkens
(74) *Attorney, Agent, or Firm* — Workman Nydegger

(57) ABSTRACT

A cabinet leg is provided including a body securable to an underside of a cabinet and a shaft engageable with the body such that rotation of the shaft moves the shaft toward or away from the body. A foot is secured to a lower end of the shaft including a first portion attached to the shaft and a second portion rotatable relative to the first portion. A plurality of openings are provided around the periphery of the foot for receiving a first end of a tool such that teeth on the tool engage with teeth on the first portion. Rotation of the tool causes rotation of the first portion relative to the second portion, thereby rotating the shaft and adjusting the height of the cabinet leg.

12 Claims, 22 Drawing Sheets

(51) Int. Cl.
    *B25B 23/00*    (2006.01)
    *A47B 91/16*    (2006.01)
    *F16M 7/00*    (2006.01)
    *F16M 11/24*    (2006.01)
    *B25B 17/00*    (2006.01)
    *B25B 21/00*    (2006.01)

(52) U.S. Cl.
    CPC .............. *F16M 11/24* (2013.01); *B25B 17/00* (2013.01); *B25B 21/002* (2013.01)

(58) Field of Classification Search
    CPC ........ B25B 17/00; B25B 21/002; F16M 7/00; F16M 11/24; F16M 2200/08; A47L 15/4253; D06F 39/125
    USPC .................... 248/188.2, 188.4, 188.5, 188.9; 312/351.1, 351.3
    See application file for complete search history.

(56) References Cited

U.S. PATENT DOCUMENTS

| | | | |
|---|---|---|---|
| 1,632,383 | A | 6/1927 | Seiden et al. |
| 7,556,227 | B2 | 7/2009 | Thuelig |
| 8,567,879 | B2 * | 10/2013 | Carter ...................... A47F 5/08 312/108 |
| 10,688,826 | B2 * | 6/2020 | Hall ....................... B60B 33/063 |
| 2016/0235200 | A1 | 8/2016 | De Bruin |

FOREIGN PATENT DOCUMENTS

| | | | |
|---|---|---|---|
| DE | 102004022681 | * | 9/2005 |
| DE | 202015001689 U1 | | 6/2015 |
| DE | 202019102684 | * | 7/2019 |
| DE | 202021102535 | * | 6/2021 |
| EP | 0292921 A2 | | 11/1988 |
| EP | 1698253 A1 | | 9/2006 |
| EP | 3138445 A1 | | 3/2017 |
| KR | 20110005693 U | | 6/2011 |
| KR | 20200112367 | * | 10/2020 |
| WO | 2010020633 A1 | | 2/2010 |
| WO | 2017153188 A1 | | 9/2017 |
| WO | 2019043660 | * | 3/2019 |

OTHER PUBLICATIONS

International Search Report and Written Opinion from PCT Application No. PCT/AU2018/051323, dated Mar. 7, 2019.

* cited by examiner

CABINET LEG AND ADJUSTMENT TOOL

FIELD OF THE INVENTION

The present invention relates to a leg for cabinets, such as kitchen cabinets and a tool for adjusting the length of the leg.

BACKGROUND TO THE INVENTION

When installing cabinets such as kitchen cabinets, it is required to level the cabinets once they have been installed in place. In a known system, the legs include a foot which is engaged with the leg by a screw thread. The foot can therefore be turned to shorten or lengthen the leg, and thereby adjust the height of the cabinet. In such a system however, it is necessary to reach under the cabinet to grasp and turn the feet for adjustment. This can be difficult, particularly when adjusting the rear legs of the cabinet from the front.

Further systems have been proposed in which a specialised tool is provided to engage with a portion of the foot. The tool is designed to rotate the foot such that the height of the leg can be adjusted without the need to reach under the cabinet. Such systems however utilise a relatively complex tool in order to engage around the foot and rotate it.

The present invention relates to a cabinet leg having features aimed at overcoming, at least in part, the above-mentioned problems. The invention is directed towards providing easy adjustment of the leg up and down using a relatively simple tool.

SUMMARY OF THE INVENTION

According to one aspect of the present invention there is provided a cabinet leg comprising:
a body securable to an underside of a cabinet;
a foot comprising a base and a shaft, the shaft being engageable with the body such that rotation of the shaft relative to the body moves the shaft toward or away from the body and the base being secured to a lower end of the shaft such that the base rests on the ground in use, the base comprising a first portion attached to the shaft and a second portion rotatable relative to the first portion;
a plurality of openings around the periphery of the base for receiving a first end of a tool;
wherein when the first end of the tool is received within one of the openings, teeth on the first end of the tool engage with teeth on the first portion of the base such that rotation of the tool causes rotation of the first portion of the base relative to the second portion of the base, thereby rotating the shaft and adjusting the height of the cabinet leg.

Preferably the first portion of the base comprises a disk secured to a lower end of the shaft having radial teeth on a lower surface thereof to engage with a frustoconical gear on a first end of the tool.

Preferably the disk rests on an upper surface of the first portion of the base.

In a preferred embodiment, the second portion comprises a circular footing including a plurality of radial walls extending upwardly therefrom such that the apertures are defined between the radial walls and the disk.

Preferably the radial walls each include outwardly tapered lower ends such that the tapered lower ends of each adjacent pair of radial walls define together an arcuate inner surface within each of the apertures.

Preferably the arcuate inner surfaces extending between adjacent walls define the apertures which are frustoconical in shape such that the apertures taper inwardly from outer ends to inner ends thereof.

Preferably an inner end of each of the apertures includes a recess to receive a lug provided on an end of the gear of the tool.

Preferably the recesses are cylindrical in shape having a domed inner end to receive the lug which is complementary in shape.

In a preferred embodiment, outer ends of the radial walls include upwardly extending lips such that the disk is received on upper edges of the walls with the periphery of the disk is located inside the lips.

Preferably the footing includes a stem extending upwardly from a centre thereof to be received into a lower end of the shaft.

Preferably the upper end of the stem is compressible and includes a rib around the periphery thereof to engage above an internal shoulder on an inner surface of the shaft.

Preferably the shaft includes an outer thread to engage with an inner thread provided within a tubular member extending downwardly from the body.

Preferably the body comprises a planar lower wall having a vertical wall extending upwardly from around the periphery thereof.

Preferably the lower wall is rectangular in shape in the embodiment shown and the vertical wall comprises front and rear walls and first and second side walls and the body has an open upper side.

In accordance with a second aspect of the present invention, there is provided a tool for use with an adjustable cabinet leg comprising:
a drive shaft having a frustoconical gear on a first end thereof and
a second end engageable with an actuator for rotation of the drive shaft about a longitudinal axis thereof;
wherein the frustoconical gear is provided to be received in an aperture in a foot of a cabinet leg for rotation of the foot relative to a base of the cabinet leg for height adjustment.

Preferably the gear includes a lug on a distal end thereof to be received in a recess provided adjacent an inner end of the aperture in the foot.

Preferably the lug comprises a cylindrical member having a domed distal end.

BRIEF DESCRIPTION OF THE DRAWINGS

The invention will now be described, by way of example, with reference to the following drawings, in which.

DETAILED DESCRIPTION OF PREFERRED EMBODIMENTS

Figure 1:
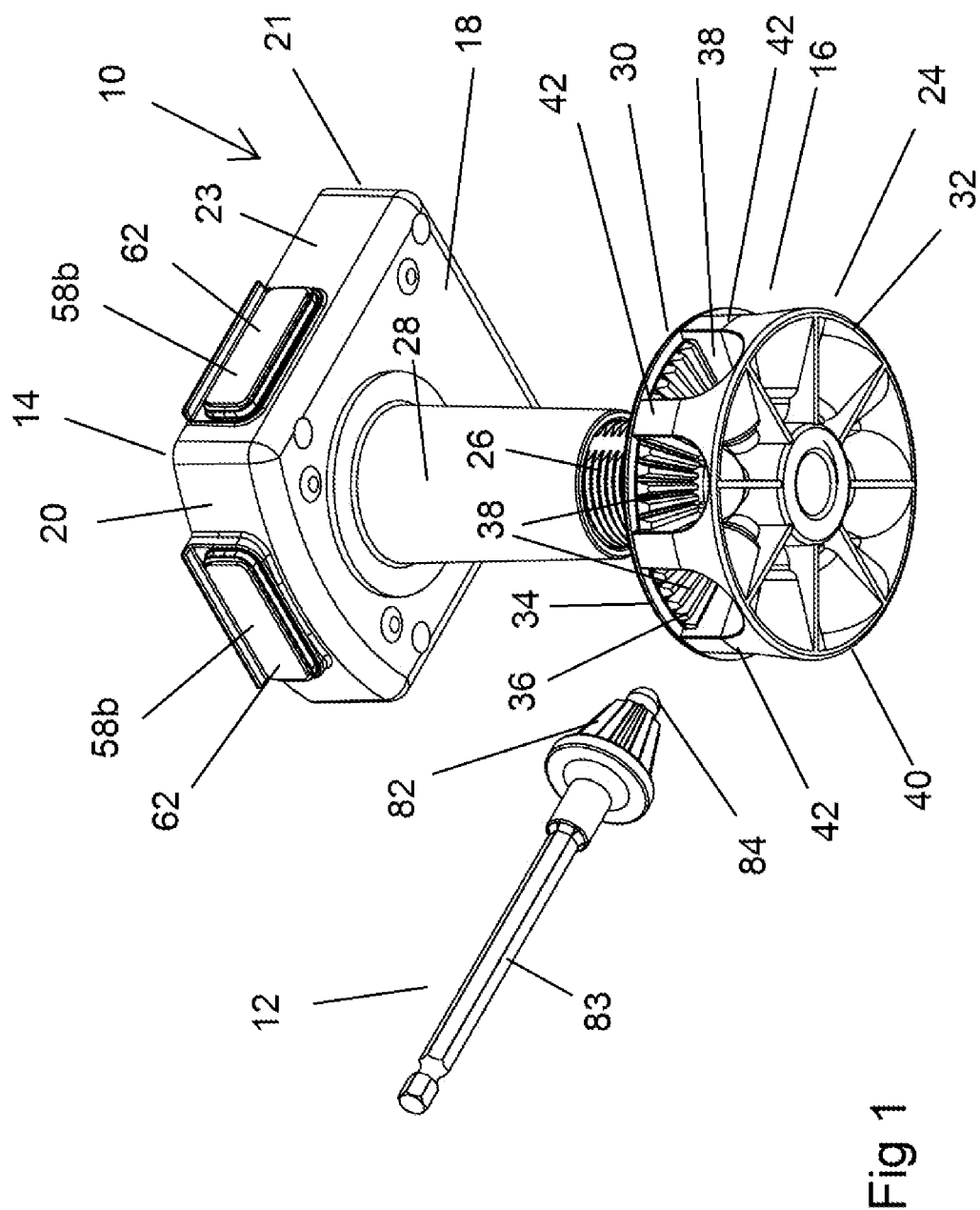
FIG. 1 is a lower perspective view of a cabinet leg in accordance with the present invention and the associated tool.
Figure 2:
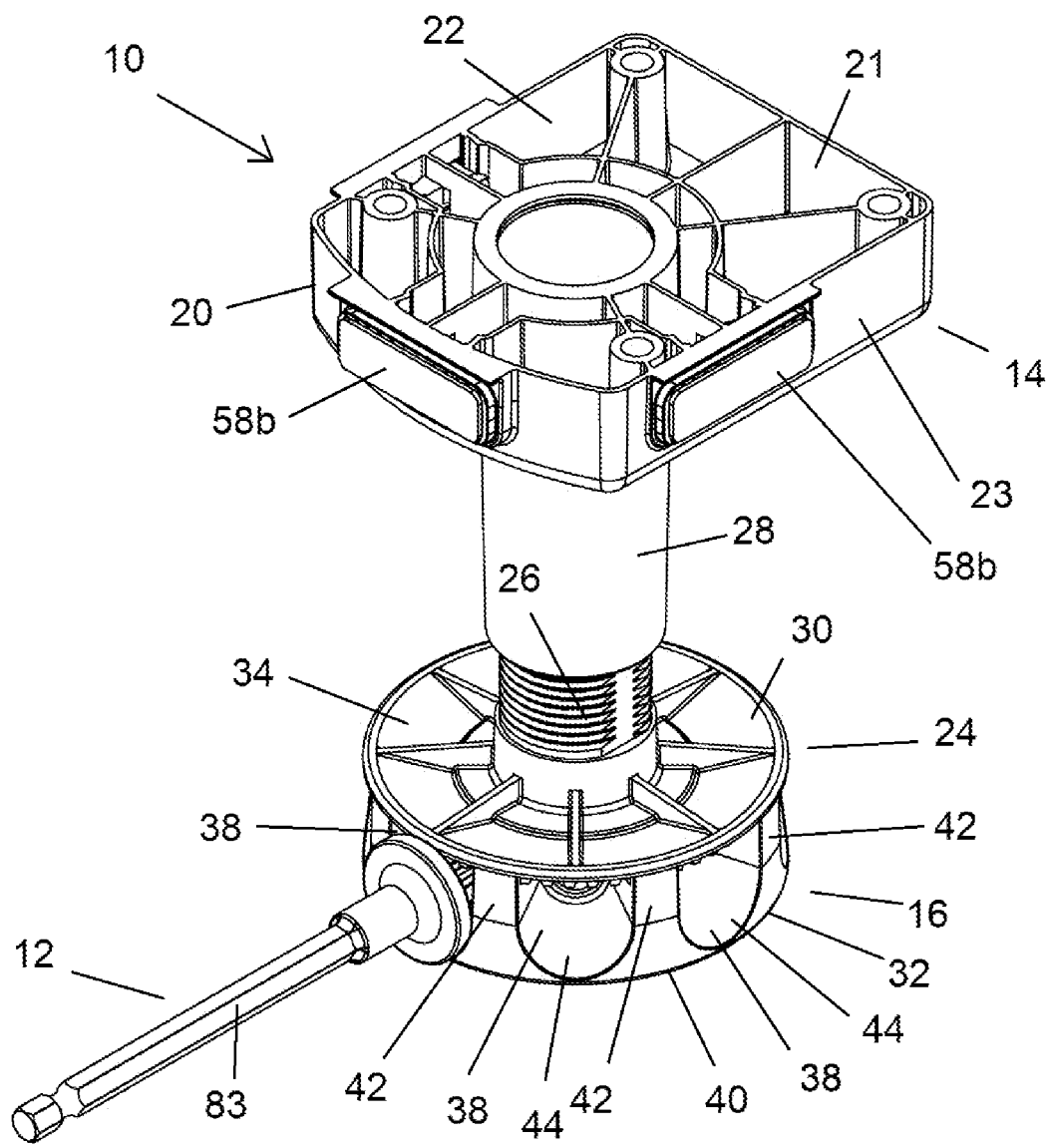
FIG. 2 is an upper perspective view of the cabinet leg of FIG. 1 with the tool engaged.

Referring to the Figures, there is shown a cabinet leg 10 which is to be securable to an underside of cabinets, such as kitchen cabinets, and which is height adjustable by an adjustment tool 12.

The cabinet leg 10 comprises generally a body 14 and a foot 16. The body 14 is provided for securing to a lower surface of the cabinet and the foot 16 extends downwardly from the body 14. The foot 16 is connected to the body 14 such that the foot 16 can be moved towards or away from the body 14 by rotation of a portion of the foot 16. Rotation of a portion of the foot 16 therefore adjusts the length of the cabinet leg 10, which may be used to adjust the height of the cabinet and level the cabinet on which the cabinet leg 10 is used.

In the embodiment shown, the body 14 comprises a generally planar lower wall 18 having a vertical wall extending upwardly from around the periphery thereof. The lower wall 18 is rectangular in shape in the embodiment shown and the vertical wall therefore comprises front and rear walls 20 and 21 and first and second side walls 22 and 23. The body 14 in the embodiment shown has an open upper side.

The foot 16 of the cabinet leg 10 comprises a base 24 and a shaft 26. The base 24 comprises a relatively short cylindrical member and the shaft 26 extends upwardly from a centre of an upper surface of the base 24. The lower wall 18 of the body 14 includes a tubular member 28 extending downwardly therefrom. The tubular member 28 includes a central bore having an internal thread to receive the distal end of the shaft 26, which includes a corresponding outer thread. The base 24 of the foot 16 may therefore be moved toward or away from the body 14 of the cabinet leg 10 by rotation of the shaft 26 such that the shaft 26 moves either into or out of from the tubular member 28.

The base 24 of the foot 16 comprises generally a first portion 30 and a second portion 32. The first portion 30 is secured to a lower end of the shaft 26 and the second portion 32 is mounted for rotation relative to the first portion 30 about a longitudinal axis of the shaft 26. The first portion 30 comprises a disk 34 fixed to a lower end of the shaft 26 such that a central axis of the disk 34 is coaxial with the longitudinal axis of the shaft 26. The disk 34 includes a plurality of radial teeth 36 on a lower surface thereof. The teeth 36 are angled such that inner ends of the teeth adjacent a centre of the disk 34 are located lower than outer ends of the teeth 36 located adjacent the periphery of the disk 34.

The second portion 32 of the base 24 of the foot 16 is securable adjacent the disk 34 to define a plurality of apertures 38 between the disk 34 and the second portion 32. The apertures 38 are provided for receiving a first end of the tool 12 and are defined between the first and second portions 32 and 34 of the base 24.

The second portion 32 comprises a circular footing 40 provided to rest on the ground in use. A plurality of radial walls 42 are provided extending upwardly from around the footing 40. Each of the apertures 38 is defined between an adjacent pair of radial walls 42 and the disk 34. The radial walls 42 each include outwardly tapered lower ends such that the tapered lower ends of each adjacent pair of radial walls 42 define together an arcuate inner surface 44 within each of the apertures 38.

The defined apertures 38 are generally frustoconical in shape such that the apertures 38 taper inwardly from outer ends to inner ends thereof and the apertures 38 are open on upper sides thereof. The open upper sides of the apertures 38 are closed off in use by the disk 34 which rests on top of the second portion 32.

Figure 3:
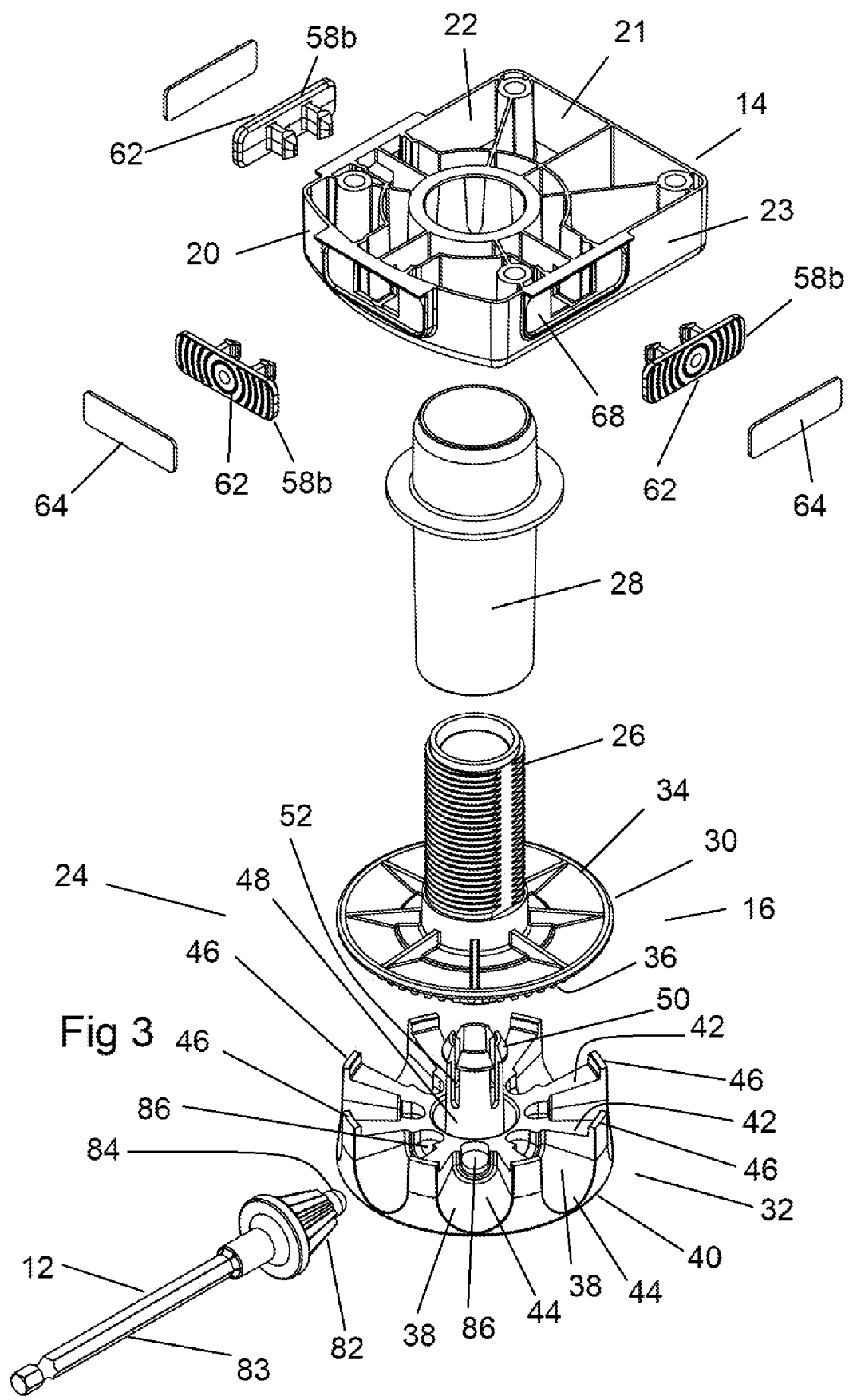
FIG. 3 is an exploded view of the cabinet leg of FIG. 1.
Figure 4:
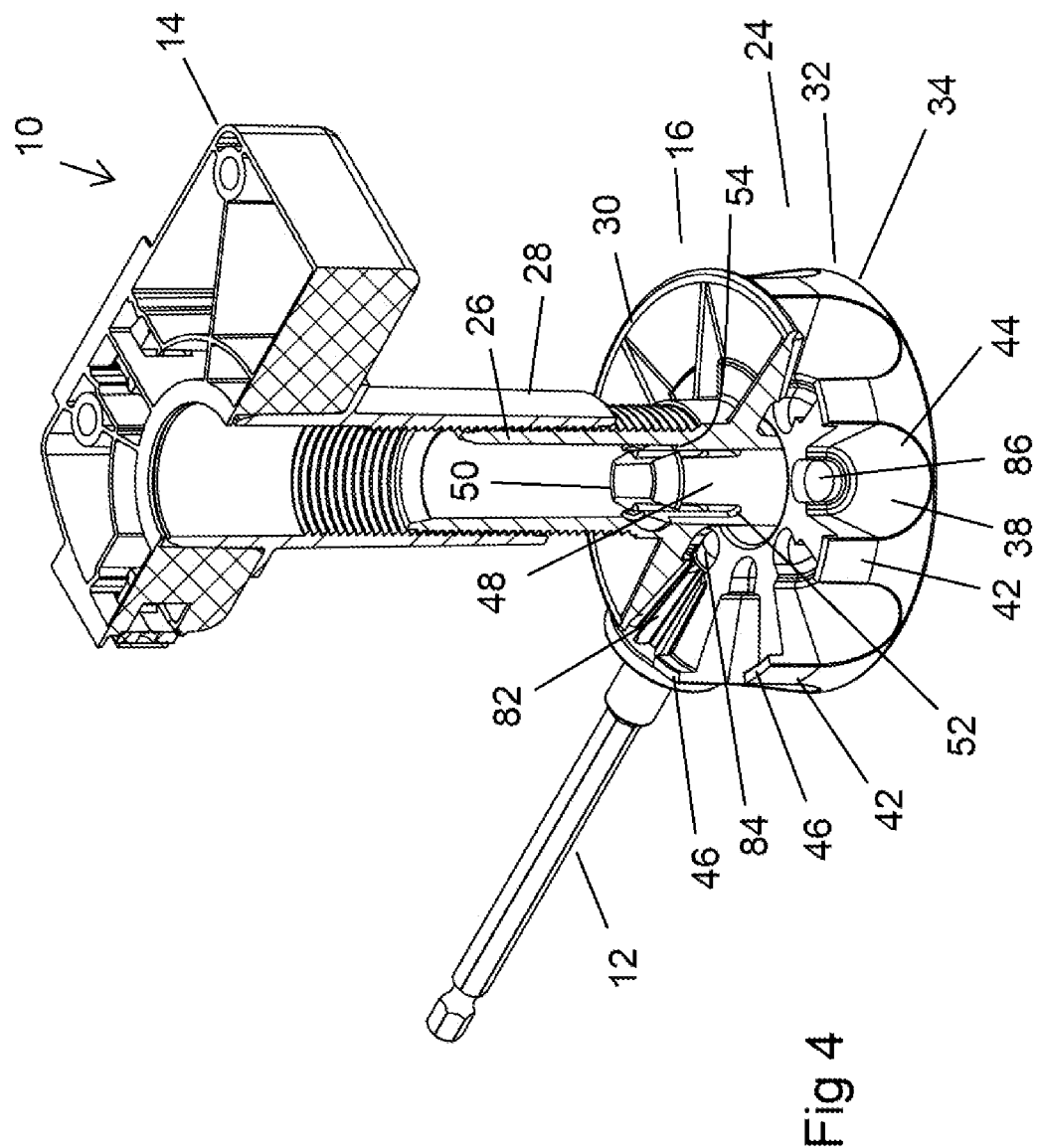
FIG. 4 is an upper perspective view of the cabinet leg and tool with portions of the cabinet leg cut away to show the tool engagement.
Figure 5:
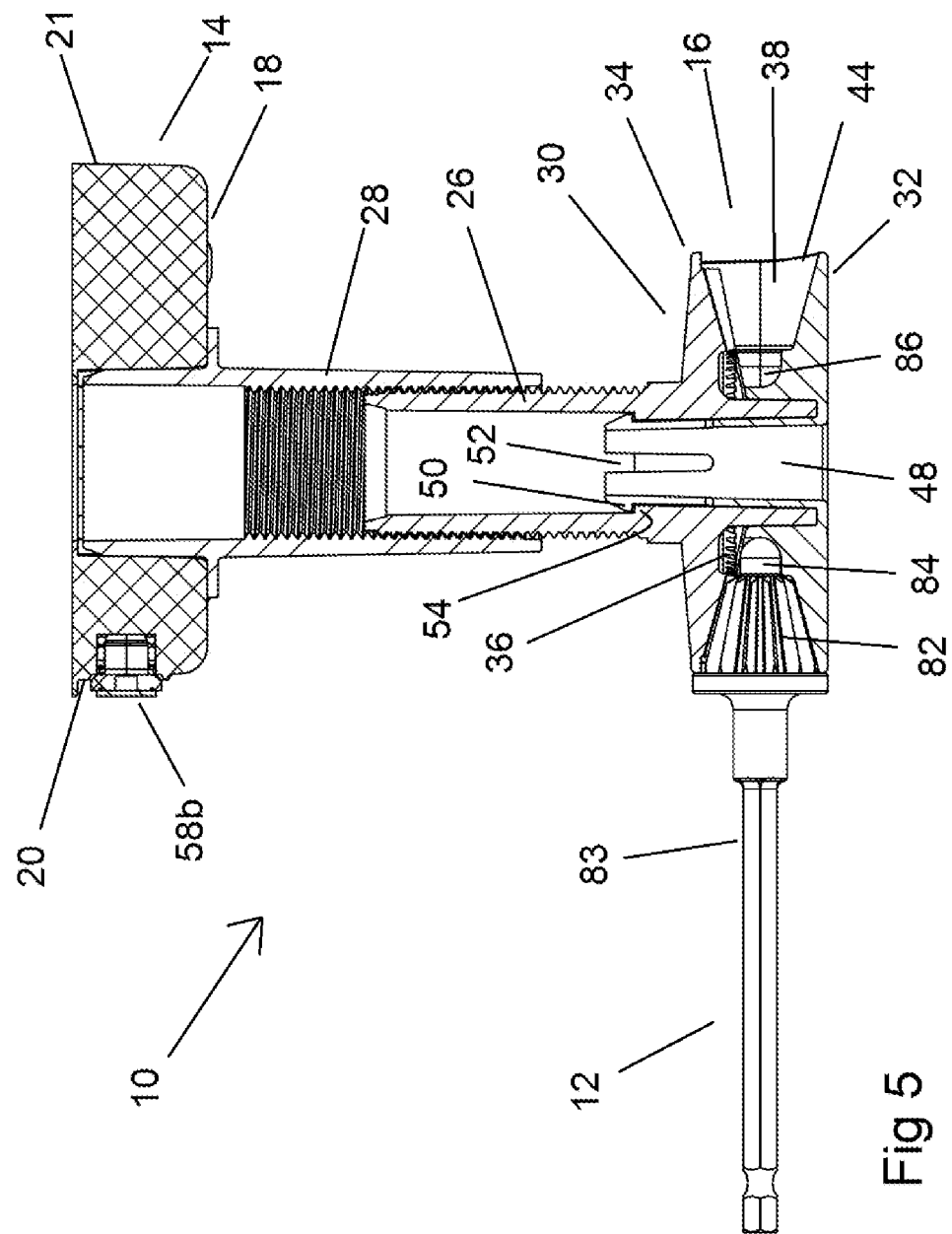
FIG. 5 is a side cross sectional view of the cabinet leg with the tool engaged.
Figure 6:
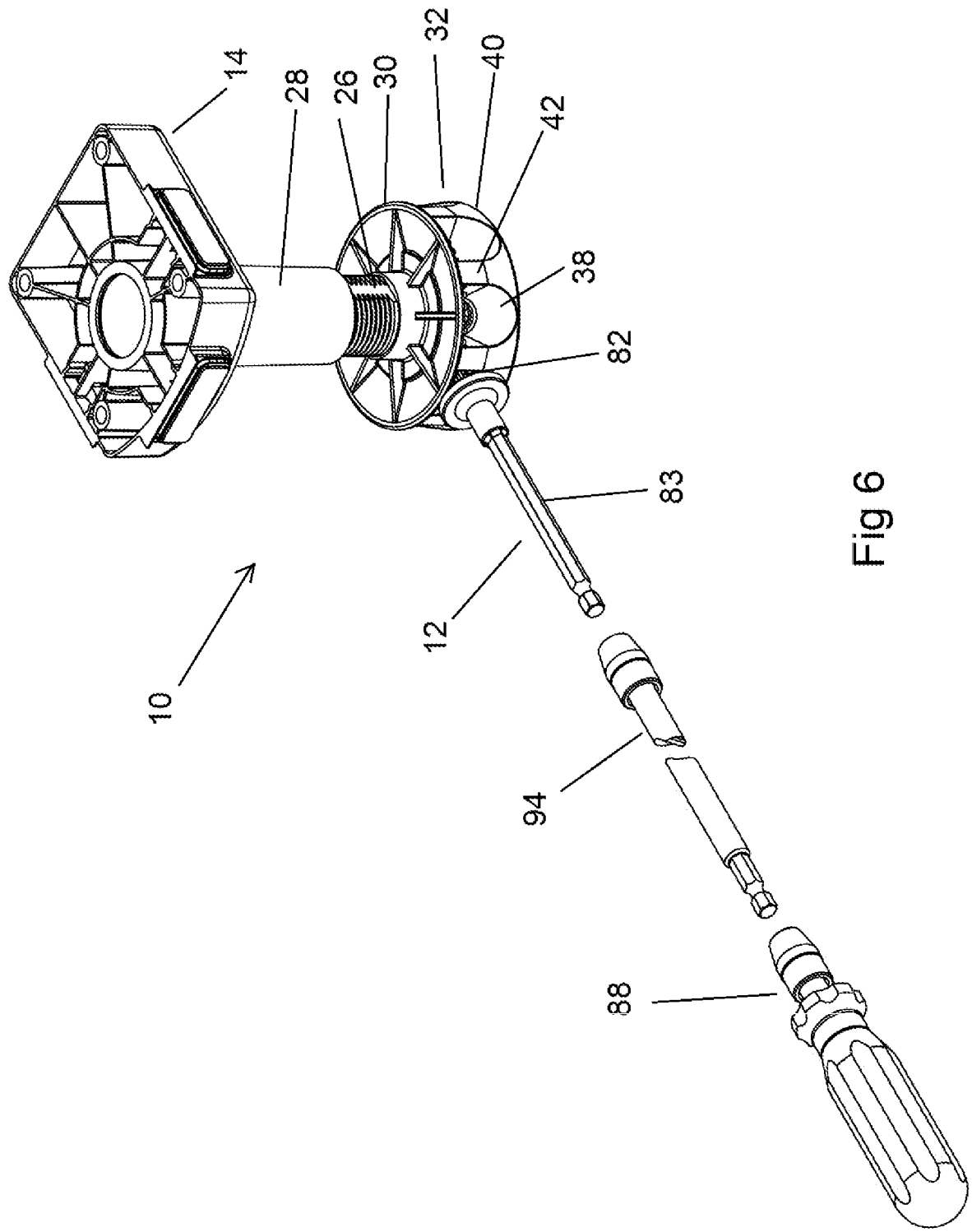
FIG. 6 is an upper perspective view showing an extension handle for use with the tool and the cabinet leg.
Figure 7:
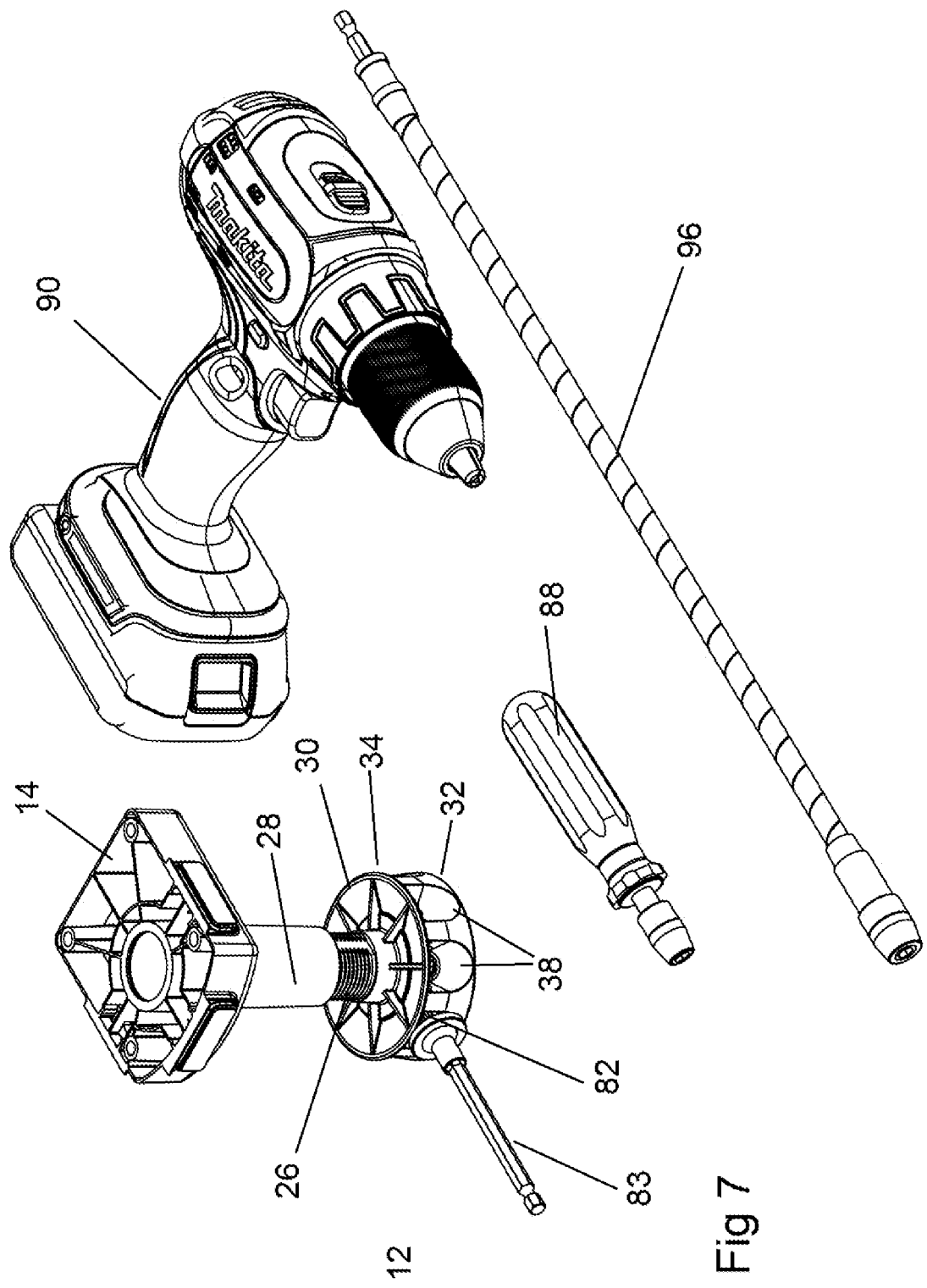
FIG. 7 is an upper perspective view showing a flexible extension, handle and cordless drill which may be used with the tool to adjust the cabinet leg height.

Outer ends of the walls 42, being ends adjacent the periphery of the base 24, include upwardly extending lips 46 (as best seen in FIG. 3). The disk 34 is dimensioned to be received on upper edges of the walls 42 such that the periphery of the disk 34 is located inside the lips 46.

The footing 40 of the second portion 32 includes a stem 48 extending upwardly from a centre thereof. The stem 48 is provided to be received into a central opening in the disk 34 such that the stem 48 extends into the interior of the shaft 26. The upper end of the stem 48 includes a rib 50 around the periphery thereof. A plurality of slots 52 are also provided extending downwardly from the upper edge of the stem 48 such that the upper edge of the stem 48 may be compressed inwardly as it is received into the lower end of the shaft 26. The rib 50 engages above an internal shoulder 54 on an inner surface of the shaft 26 such that the stem 48 retains the second portion 32 of the base 24 in engagement with the shaft 26. The second portion 32 may therefore rotate about the longitudinal axis of the shaft 26 relative to the shaft 26 and the disk 34.

The tool 12 comprises a drive shaft 83. The first end of the drive shaft 83 is provided with a gear 82 thereon. The gear 82 is frustoconical in shape and includes teeth around an outer tapered surface thereof. A second end of the drive shaft 83 is to be received in an actuator such that the drive shaft 83 is rotatable about its longitudinal axis. The actuator may comprise a handle 88 for manual rotation of the drive shaft 83, or may comprise a rotary tool, such as a cordless drill 90.

The frustoconical gear 82 provided on the first end of the tool 12 has a taper corresponding to the inward taper of the arcuate surfaces 44 of the apertures 38 provided around the periphery of the base 24 of the foot 16. An outer end of the gear 82 includes a lug 84. The lug 84 in the embodiment shown comprises a generally cylindrical member having a domed distal end. Inner ends of the apertures 38 in the base 24 include recesses 86 having a shape complementary to that of the lug 84. The recesses 86 in the inner ends of the apertures 38 thereby receive the lug 84 in order to correctly locate the gear 82 of the tool 12 within the aperture 38.

When the gear 82 of the tool 12 is located correctly within one of the apertures 38, the teeth around the periphery of the frustoconical gear 82 engage with the teeth 36 on the lower surface of the disk 34. Therefore, rotation of the tool 12 about its longitudinal axis causes rotation of the disk 34 about the longitudinal axis of the shaft 26. The second portion 32 of the base 24 will remain in a stationary position, being held against rotational movement by the tool 12 and frictional forces between a lower surface of the second portion 32 of the base 24 and the ground.

Figure 8:
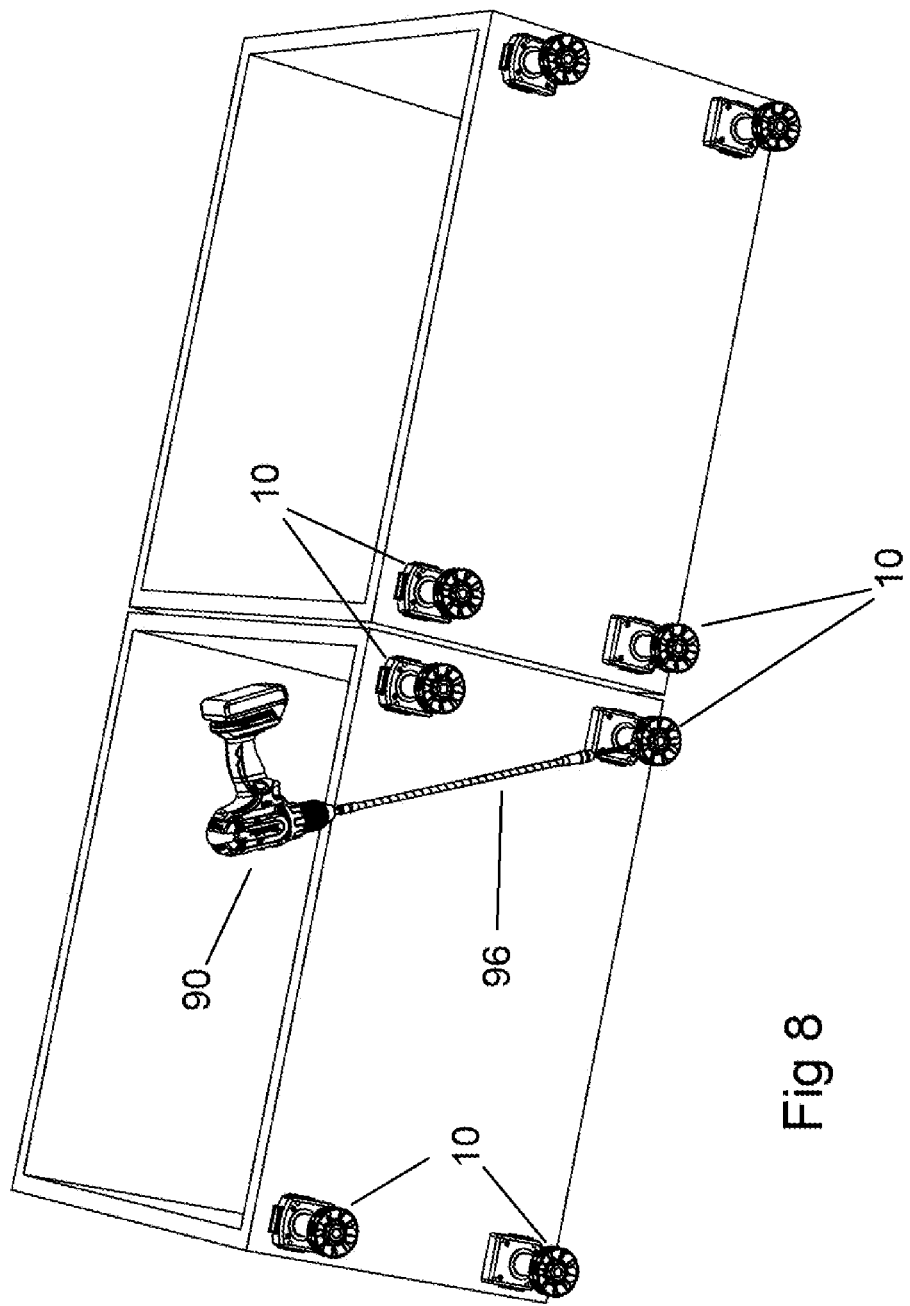
FIG. 8 is a lower perspective view showing the tool operated by a cordless drill engaging with a rear cabinet leg attached to a cabinet.
Figure 9:
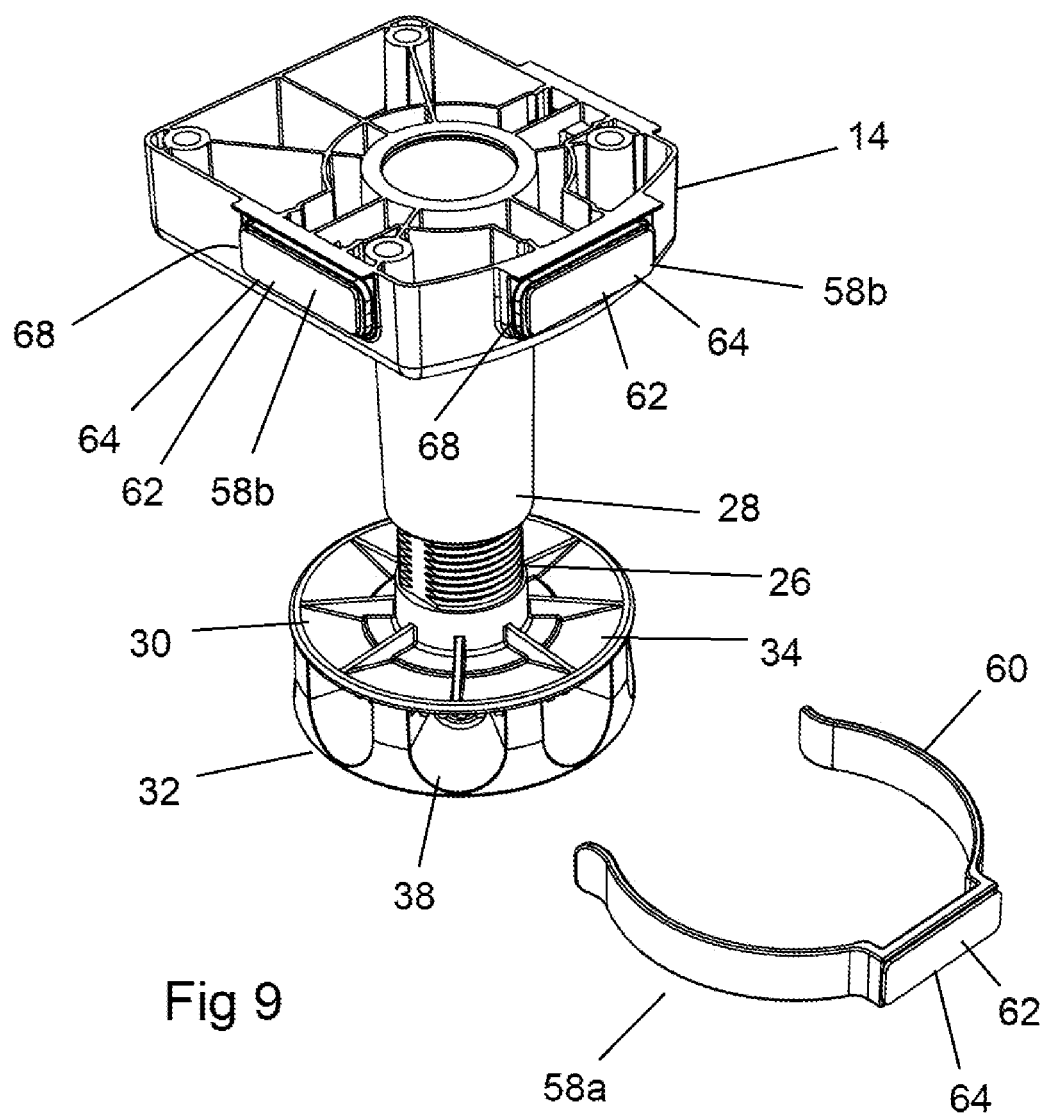
FIG. 9 is a view showing a lower support clip prior to engagement with the cabinet leg.
Figure 10:
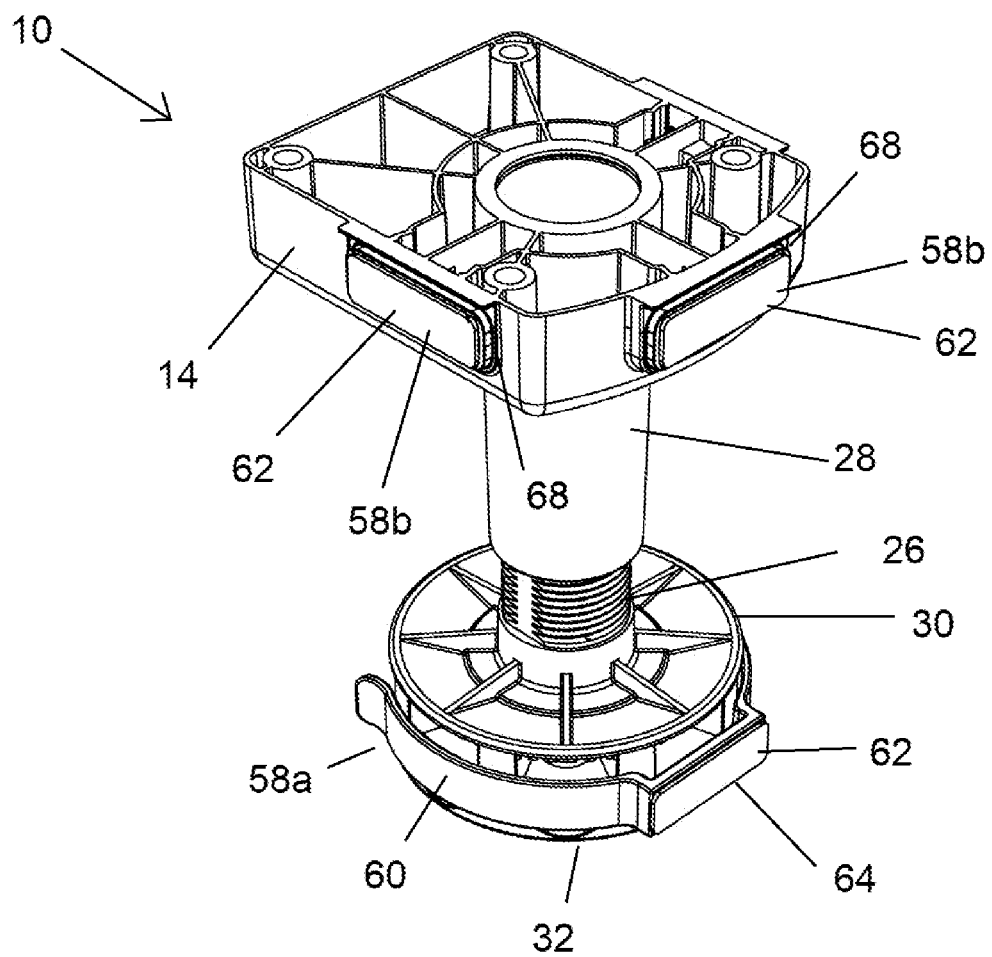
FIG. 10 is a view showing the lower support clip engaged with the cabinet leg.
Figure 11:
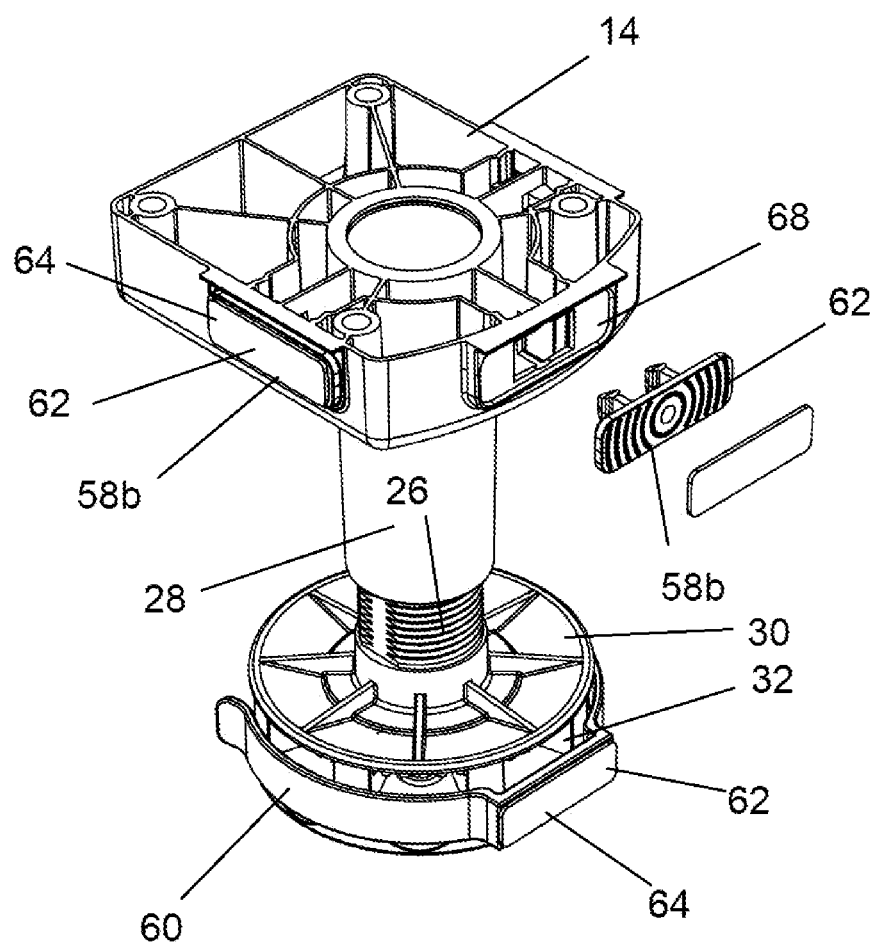
FIG. 11 is a view showing an upper support clip disengaged from the body of the cabinet leg.
Figure 12:
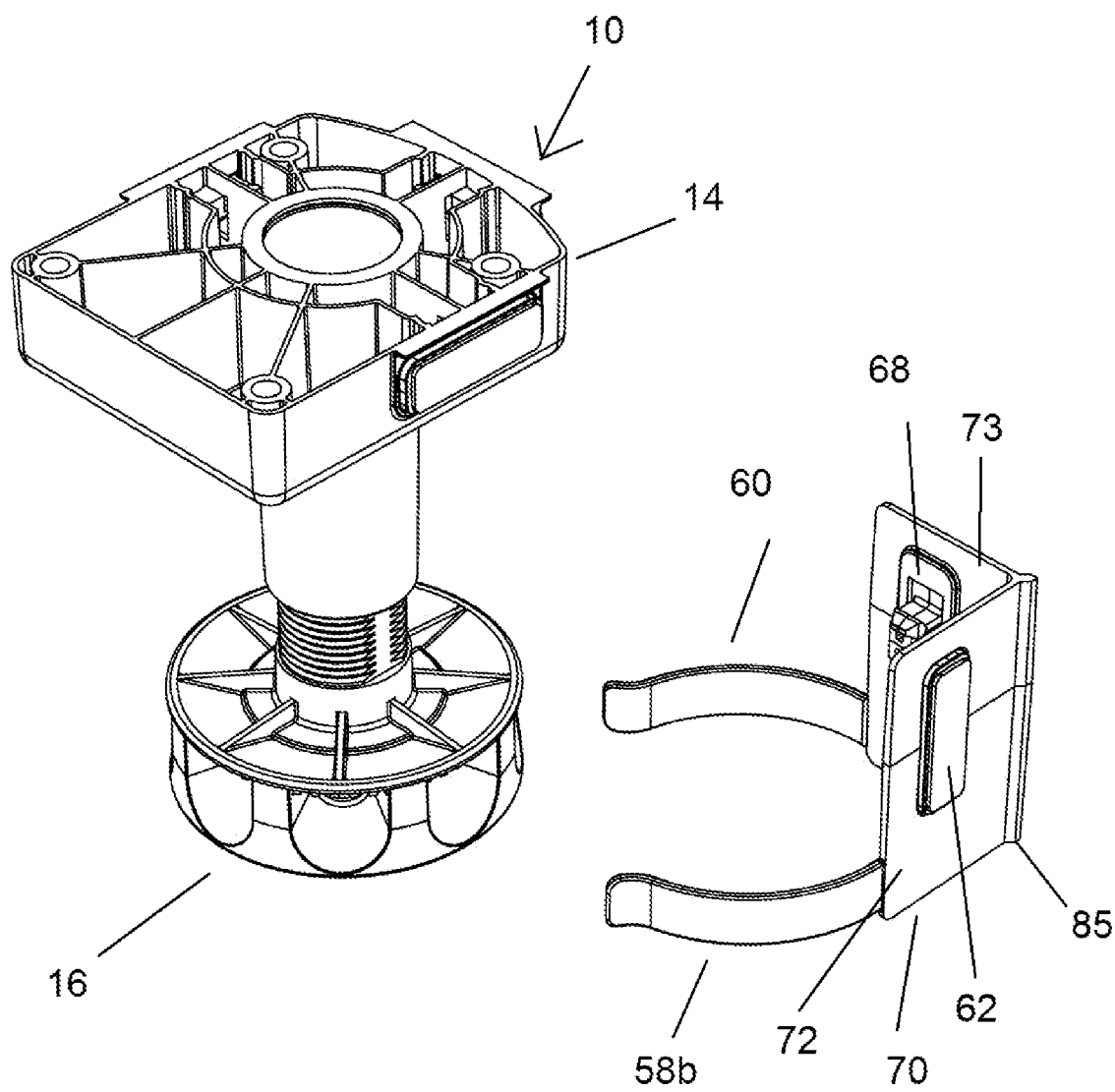
FIG. 12 is a view showing a corner support clip prior to engagement with the cabinet leg.
Figure 13:
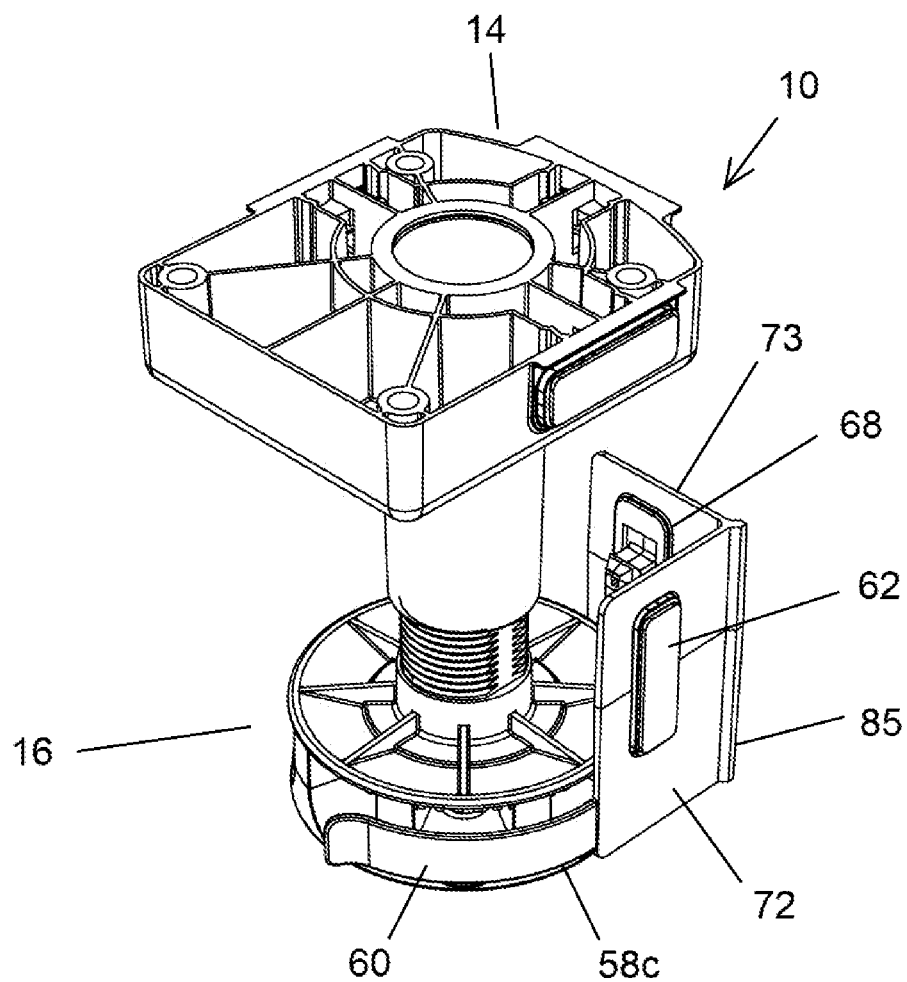
FIG. 13 is a view showing the corner support clip engaged with the cabinet leg.
Figure 14:
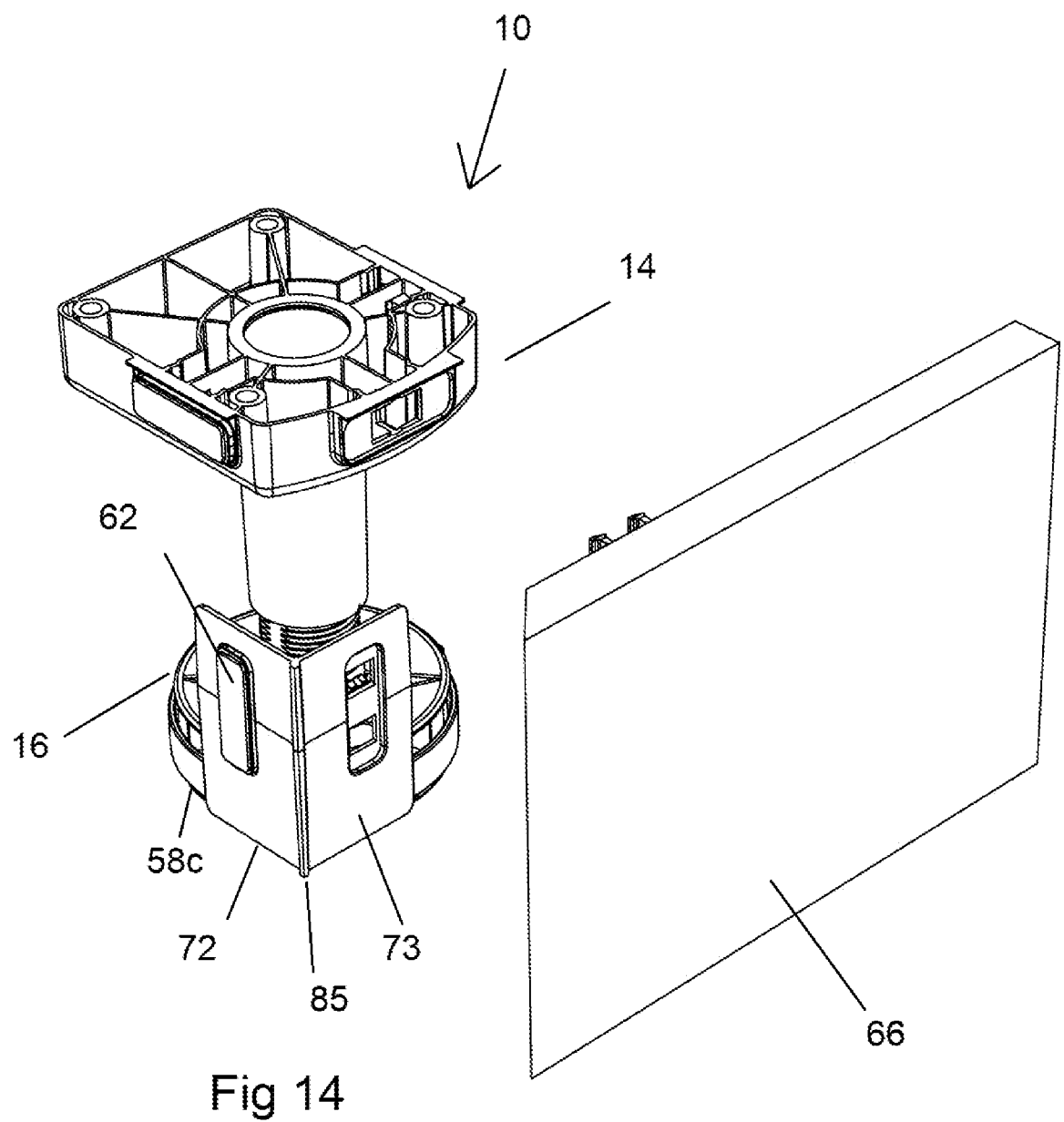
FIG. 14 is a view showing a kick board prior to engagement with the corner support clip.
Figure 15:
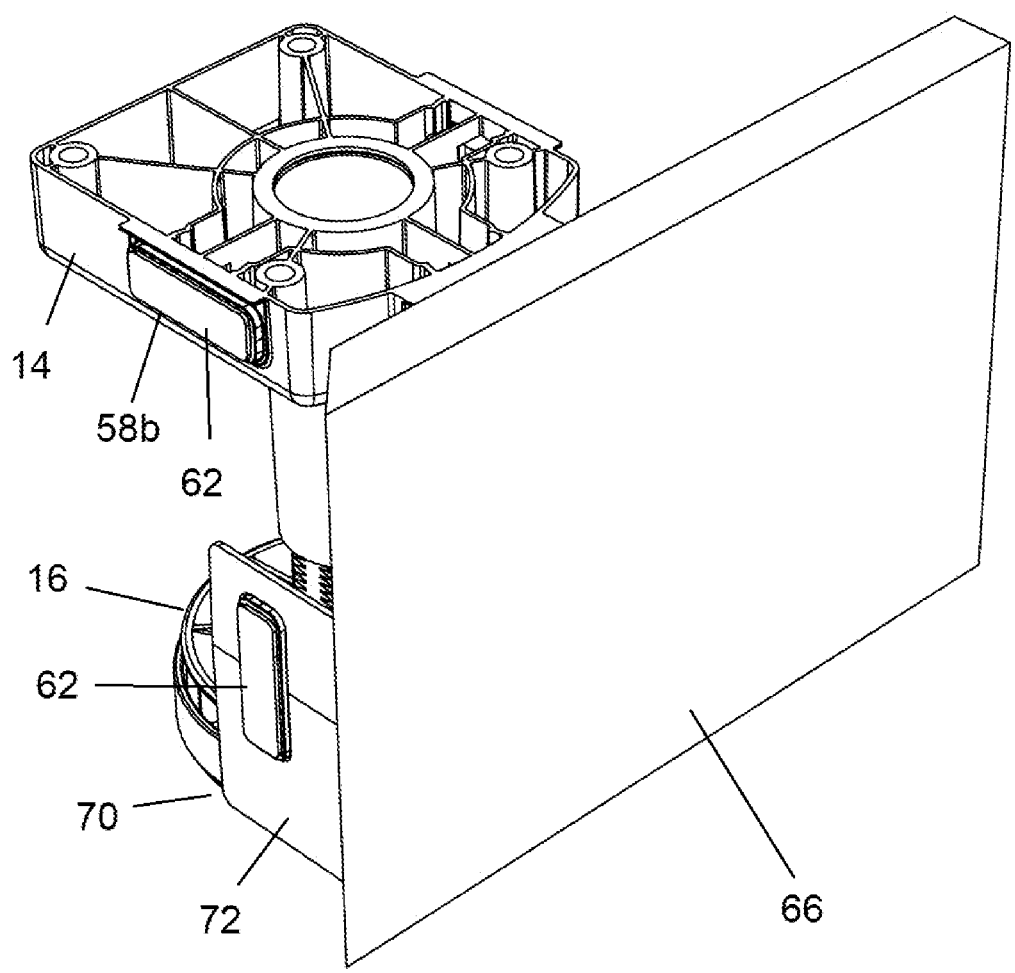
FIG. 15 is a view showing the kick board engaged with the corner support clip.
Figure 16:
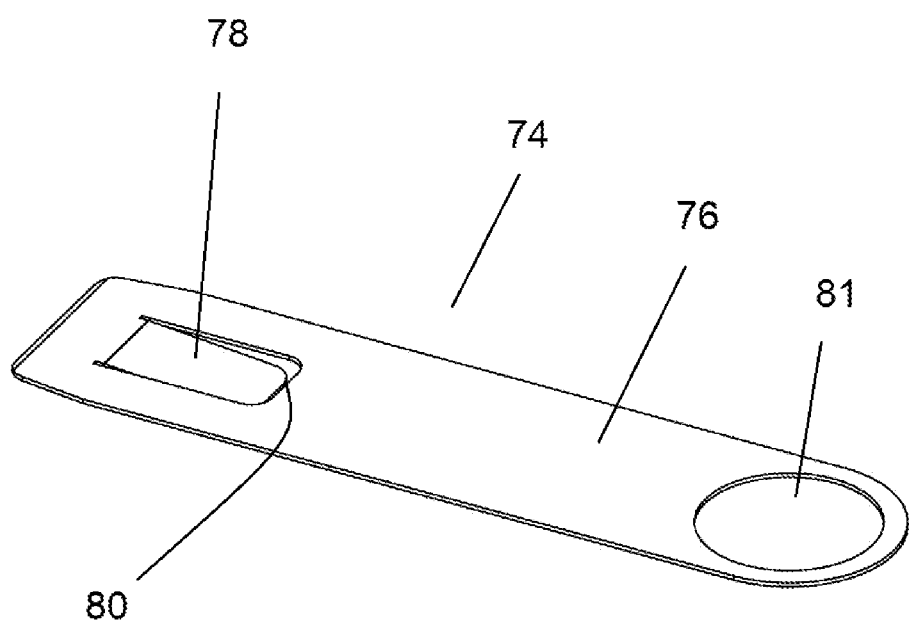
FIG. 16 is an upper perspective view of a removal tool for use with the cabinet leg of the present invention.
Figure 17:
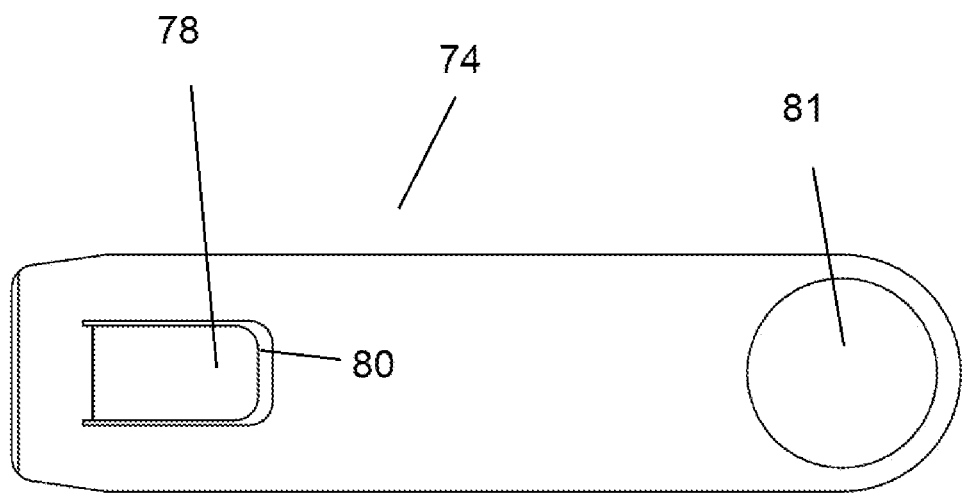
FIG. 17 is a top view of the removal tool of FIG. 16.
Figure 18:
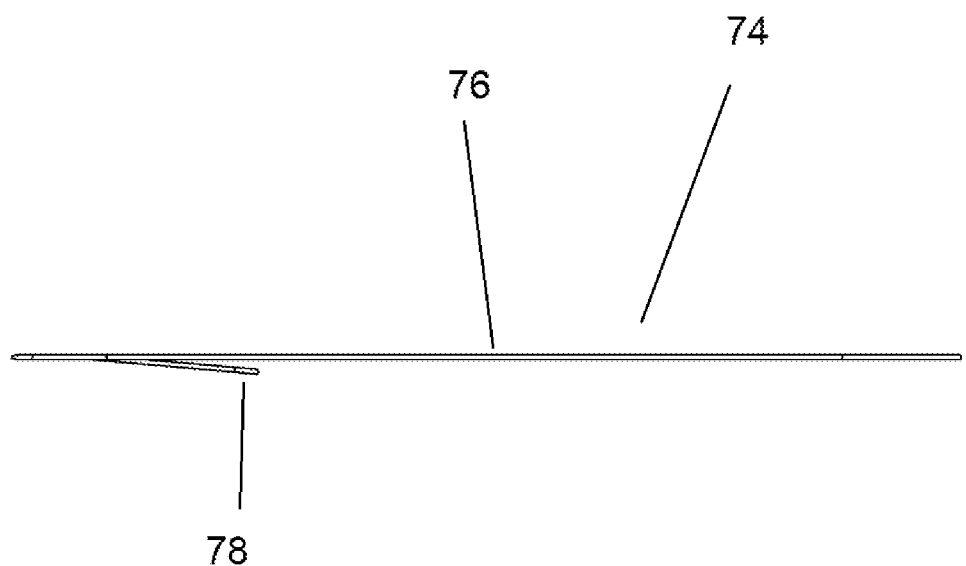
FIG. 18 is a side view of the removal tool of FIG. 16.

In use, the tool 12 can be used in combination with the cabinet leg 10 to adjust the height of the cabinet leg as shown, for example, in FIG. 8. The second end of the drive shaft 80 is engaged with an actuator, for example the handle 88 or the cordless drill 90. An extension piece may be used, such as a rigid extension 94 or a flexible extension 96 to allow the tool 12 to reach to rear legs of the cabinets. The tool 12 is then slid under the cabinet until the gear 82 engages into one of the apertures 38 on the near side of the foot 16. The tool 12 may then be rotated in order to rotate the first portion 30 of the foot 16 relative to the second portion 32 of the foot 16. This rotates the shaft 26 within the threaded bore of the tubular member 28. The foot 16 therefore may be moved either towards or away from the body 14 by rotation of the tool 12 in first or second directions. The length of the cabinet leg 10 can therefore be adjusted to a correct and level height without the need to reach under the cabinet. As the second portion 32 of the foot 16, which is resting on the ground, does not rotate, this provides an advantage over other types of feet where the lower portion of the foot does rotate, as rotation of such feet can be difficult due to uneven or rough surfaces on the ground.

The cabinet leg 10 of the present invention may also include one or more support clips 58, as shown in FIGS. 9 to 21. A lower support clip 58a comprises a flexible arcuate member 60 from which a planar faceplate 62 extends. The arcuate member 60 is dimensioned to be received around the outer surface of the second portion 32 of the foot 16 below the disk 34 and is resilient such that it may be pressed into place around the second portion 32. The faceplate 62 extends outwardly from the centre of the arcuate member 60 and includes an outer surface 64 to which fixing means may be applied to engage with the surface of a kick board 66. The fixing means may comprise an adhesive or double-sided tape. The faceplates 62 may also be further fixed to the kick boards 66 by screws once held in place by the adhesive.

The cabinet leg 10, in the embodiment shown, includes a plurality of upper support clips 58b. The upper support clips 58b comprise separate faceplates 62 receivable in recesses 68 provided in the vertical walls of the body 14. In the embodiment shown, there are provided upper support clips 58b on the front wall 20 and on the first and second side walls 22 and 23 of the body 14. The faceplates 62 of the upper support clips 58b may simply be pressed into the recesses 68 and provided with fixing means on outer surfaces thereof. The kick board 66 may therefore be engaged with the outer surface of one or more of the faceplates 62 of the upper support clips 58b. If the kick board 66 is to be removed, it may be pulled outwardly thereby disengaging the arcuate member 60 from the foot 16 and the faceplates 62 of the upper support clips 58b from their respective recesses 68.

FIGS. 12 to 15 show a corner support clip 58c. The corner support clip 58c is similar to the lower support clip 58a but includes a corner member 70 secured to an outer surface of the arcuate member 60. The corner member 70 comprises an angle plate formed by first and second perpendicular side plates 72 and 73. The outer surfaces of the side plates 72 and 73 include faceplates 62 provided in recesses 68 in a similar manner to the upper support clips 58b described previously. The faceplate 62 can engage with adjacent perpendicular sections of the kick board 66 as shown in the Figures.

The corner member 70 includes a rib 85 along the intersection of the side plates 72 and 73. The rib 85 may be used to mark the corner of the kick board 66 for cutting. The uncut kick board 66 may be placed up against the corner member 70 and a pencil mark made along the rib 85 to provide the location for cutting.

FIGS. 16 to 21 show a removal tool 74 for use in removing the kick boards 66 attached to the cabinet leg 10 of the present invention. The removal tool 74 comprises a planar elongate member 76. The elongate member 76 includes a flexible tab 78 provided in an opening 80 adjacent a first end of the elongate member 76. A hole 81 is provided adjacent a second end of the elongate member 76 for holding the removal tool.

Figure 19:
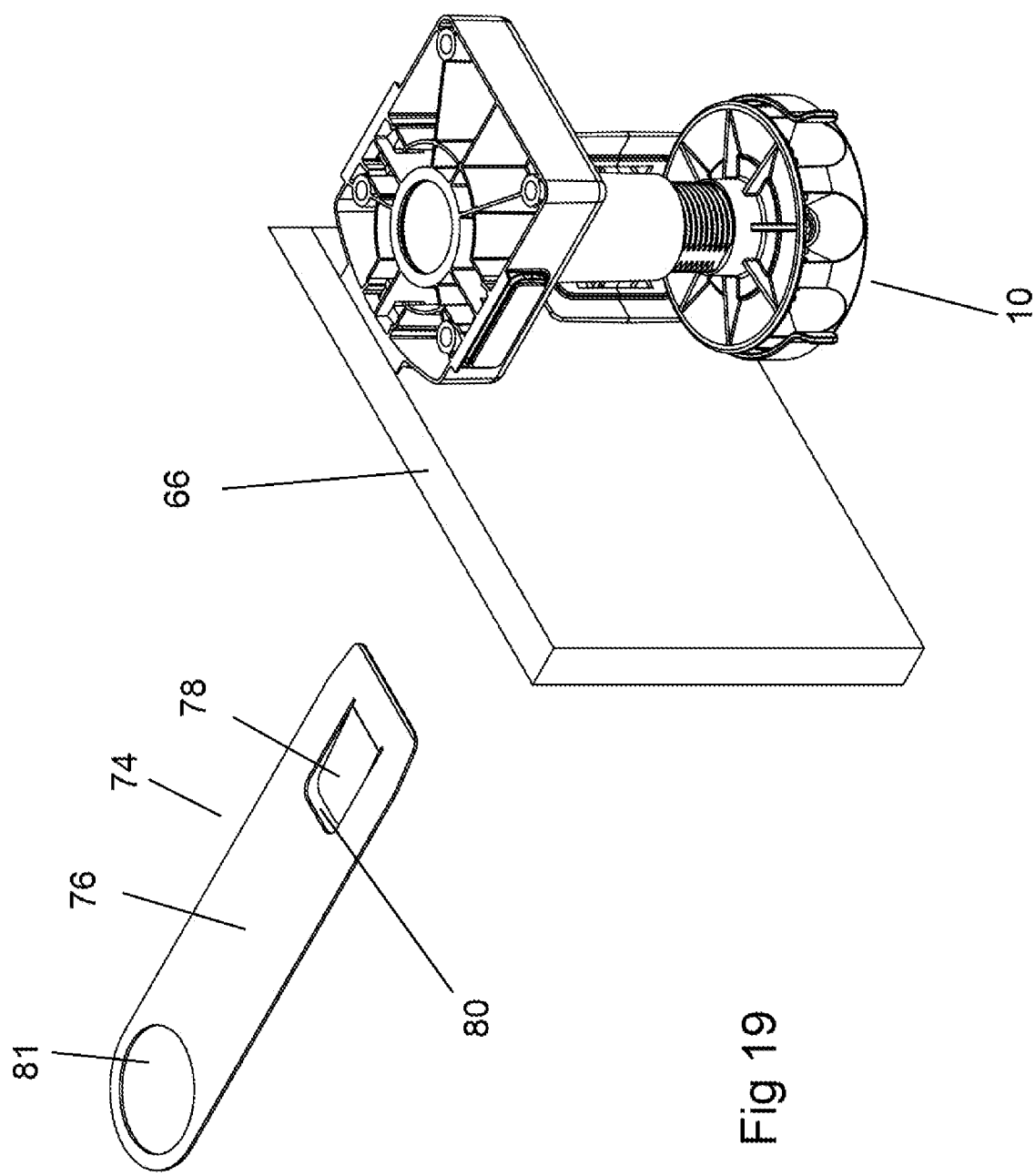
FIG. 19 is a view of the removal tool prior to engagement with the kick board.
Figure 20:
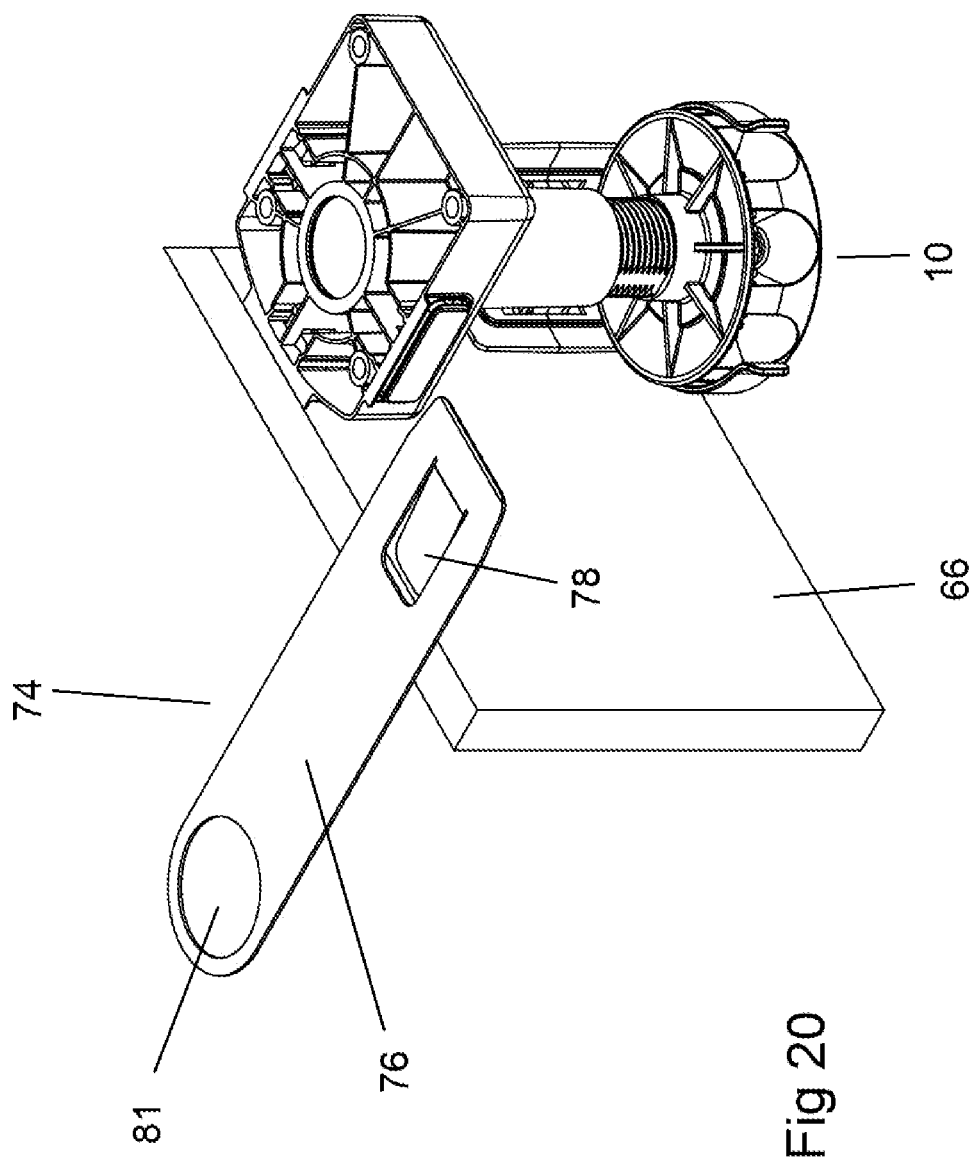
FIG. 20 is a view of the removal tool engaged with the kick board.
Figure 21:
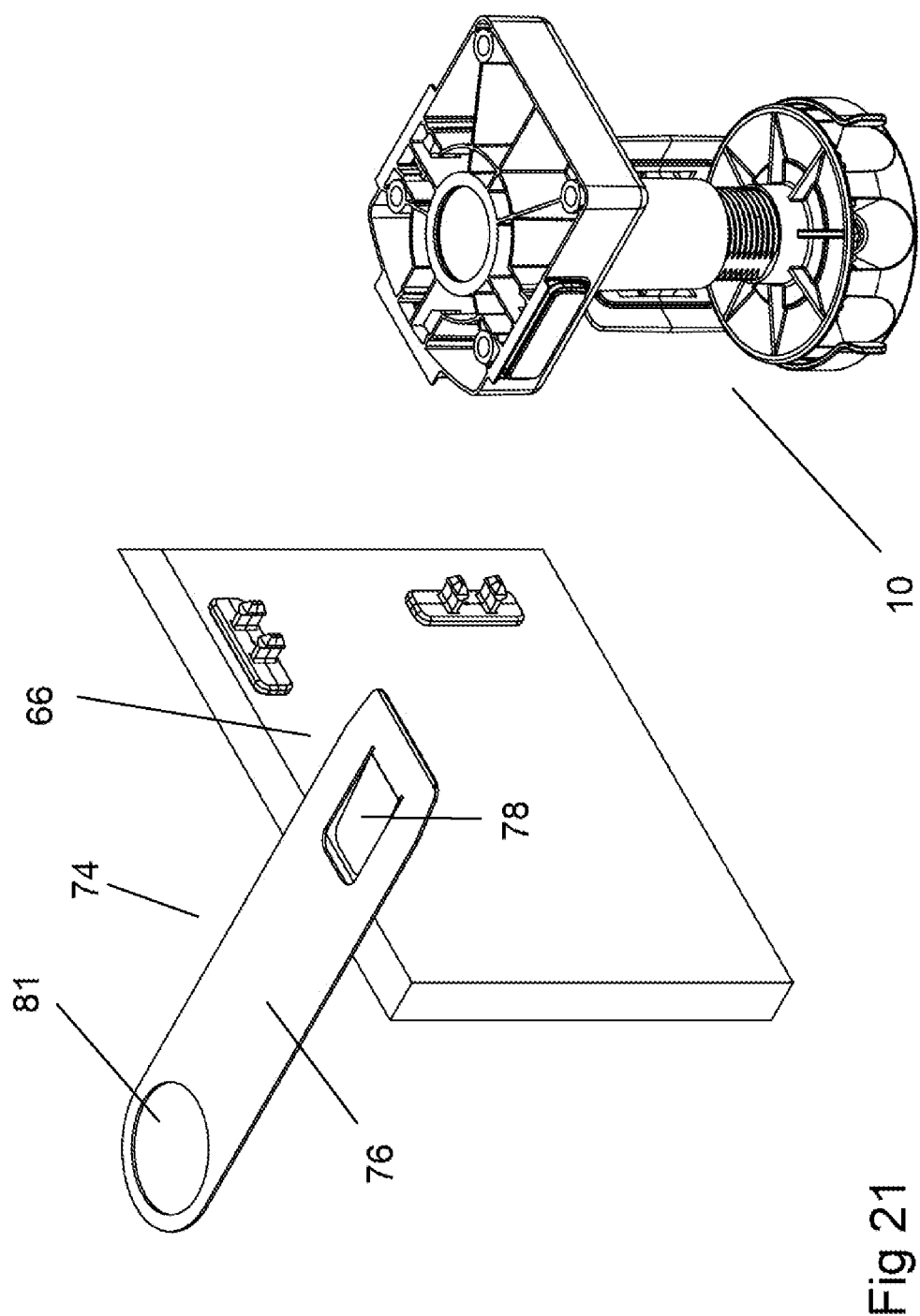
FIG. 21 is a view of the removal tool removing the kick board.

The removal tool 74 is used as shown in FIGS. 19 to 21. The first end of the removal tool 74 is inserted between the kick board 66 and the cabinet, thereby depressing the tab 78 into the plane of the elongate member 76. The tab 78 flexes back out of the plane of the elongate member 76 once it has moved beyond the kick board 66. Pulling the removal tool 74 outwardly thereby engages the kick board 66 by the tab 78 such that the kick board 66 can be pulled away from the cabinet leg 10.

Figure 22:
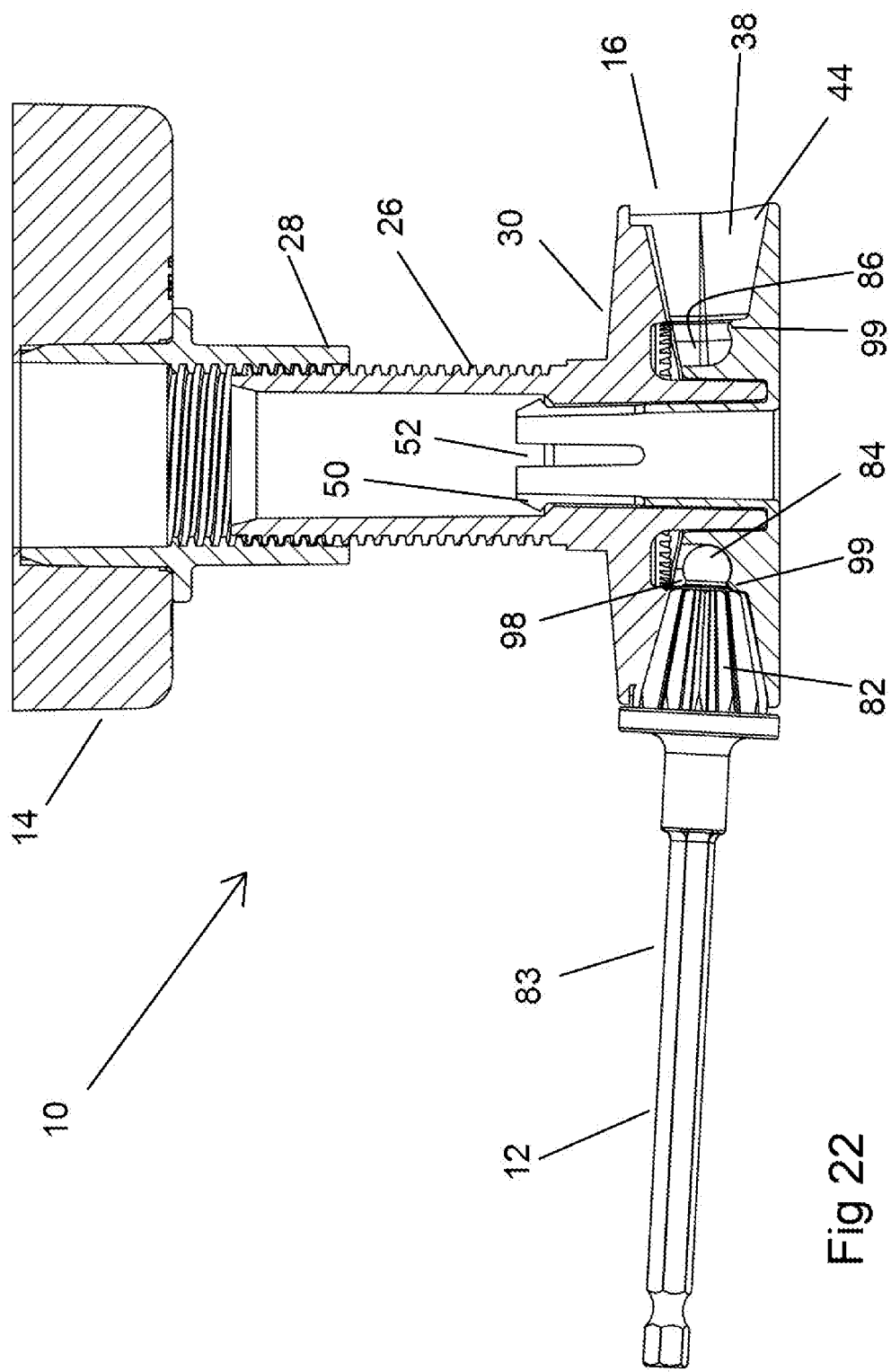
FIG. 22 is a side cross sectional view of a second embodiment of a cabinet leg in accordance with the present invention.

FIG. 22 shows an alternative embodiment of a cabinet leg 10 and associated tool 12. The leg 10 and tool 12 of FIG. 22 are similar to the previous embodiment and like reference numerals are used to denote like parts.

In the embodiment of FIG. 22, the lug 84 of the tool 12 includes a groove 98 around a base thereof. The recesses 86 within the apertures 38 of the foot 16 each include a corresponding rib 99 around the periphery thereof. The rib 99 is provided such that the lug 84 is received into the recess 86 by press fit, with the rib 99 being located within the groove 98. The engagement of the rib 99 within the groove 98 thereby retains the gear 82 in engagement within the aperture 38 in use.

Further, the arcuate inner surfaces 44 of the apertures 38 in the embodiment of FIG. 22 are shaped such that when the gear 82 of the tool 12 is received within the apertures 38, the drive shaft 83 is angled slightly upwardly away from the leg 10. This allows additional space under the second end of the drive shaft 83 to allow for easier use with the cordless drill 90.

It will be readily apparent to persons skilled in the relevant arts that various modifications and improvements may be made to the foregoing embodiments, in addition to those already described, without departing from the basic inventive concepts of the present invention.

The invention claimed is:

1. A cabinet leg comprising:
   a body securable to an underside of a cabinet;
   a foot comprising a base and a shaft, the shaft being engageable with the body such that rotation of the shaft relative to the body moves the shaft toward or away from the body and the base being secured to a lower end of the shaft such that the base rests on the ground in use, the base comprising a first portion attached to the shaft and a second portion rotatable relative to the first portion, the first portion comprising a disk secured to a lower end of the shaft having radial teeth on a lower surface thereof and resting on an upper surface of the second portion; and a plurality of apertures around the periphery of the base for receiving a frustoconical gear on a first end of a tool;

wherein the second portion comprises a circular footing including a plurality of radial walls extending upwardly therefrom such that the apertures are defined between the radial walls and the disk such that when the first end of the tool is received within one of the apertures, teeth on the first end of the tool engage with the radial teeth on the first portion of the base such that rotation of the tool causes rotation of the first portion of the base relative to the second portion of the base, thereby rotating the shaft and adjusting the height of the cabinet leg.

2. The cabinet leg according to claim 1, wherein the radial walls each include outwardly tapered lower ends such that the tapered lower ends of each adjacent pair of radial walls define together an arcuate inner surface within each of the apertures.

3. The cabinet leg according to claim 2, wherein the arcuate inner surfaces extending between adjacent walls define the apertures which are frustoconical in shape such that the apertures taper inwardly from outer ends to inner ends thereof.

4. The cabinet leg according to claim 3, wherein an inner end of each of the apertures includes a recess to receive a lug provided on an end of the gear of the tool.

5. The cabinet leg according to claim 4, wherein the recesses are cylindrical in shape having a domed inner end to receive the lug which is complementary in shape.

6. The cabinet leg according to claim 1, wherein outer ends of the radial walls include upwardly extending lips such that the disk is received on upper edges of the walls with the periphery of the disk is located inside the lips.

7. The cabinet leg according to claim 1, wherein the footing includes a stem extending upwardly from a centre thereof to be received into a lower end of the shaft.

8. The cabinet leg according to claim 7, wherein the upper end of the stem is compressible and includes a rib around the periphery thereof to engage above an internal shoulder on an inner surface of the shaft.

9. The cabinet leg according to claim 1, wherein the shaft includes an outer thread to engage with an inner thread provided within a tubular member extending downwardly from the body.

10. The cabinet leg according to claim 1, wherein the body comprises a planar lower wall having a vertical wall extending upwardly from around the periphery thereof.

11. The cabinet leg according to claim 10, wherein the lower wall is rectangular in shape and the vertical wall comprises front and rear walls and first and second side walls, and the body has an open upper side.

12. The cabinet leg according to claim 10, wherein the lower wall is rectangular in shape and the vertical wall comprises front and rear walls and first and second side walls, and the body has an open upper side.

\* \* \* \* \*